United States Patent
Hardy

[15] 3,690,549
[45] Sept. 12, 1972

[54] AUXILIARY HEATING SYSTEM FOR AUTOMOTIVE VEHICLES

[72] Inventor: Warren Frank Hardy, 9609 Dixie Highway, Louisville, Ky. 40272

[22] Filed: Jan. 27, 1971

[21] Appl. No.: 110,142

[52] U.S. Cl. .................237/2 A, 237/12.3 C, 237/28
[51] Int. Cl. ...........................................B60h 1/14
[58] Field of Search ....................237/2, 8, 12.3 C, 28

[56] References Cited
UNITED STATES PATENTS

| | | |
|---|---|---|
| 3,072,176 | 1/1963 | Sunday..............237/12.3 C X |
| 3,131,864 | 5/1964 | Young........................237/8 A |
| 3,220,397 | 11/1965 | Fenner........................237/8 A |
| 3,362,637 | 1/1968 | Cornell........................237/2 A |

*Primary Examiner*—Edward J. Michael
*Attorney*—Arthur F. Robert

[57] ABSTRACT

An auxiliary heating system, composed of an auxiliary heater and automatic controls, is operatively mounted in an automobile to heat the interior of the car and to maintain it at a predetermined above-freezing subnormal temperature of say 40° F. during engine shut-off periods in cold weather when the ambient temperature is at or below said predetermined temperature.

6 Claims, 3 Drawing Figures

INVENTOR.
WARREN FRANK HARDY

BY Arthur Robert

ATTORNEY

AUXILIARY HEATING SYSTEM FOR AUTOMOTIVE VEHICLES

BACKGROUND OF THE INVENTION

1. Field of the Invention

The present invention relates to an auxiliary system for heating the interior of automotive and like vehicles during engine shut-down periods. For the sake of clarity, we shall hereafter refer only to "cars" or "automobiles".

2. Description Of The Prior Art

Most automobiles in use today come from the factory equipped with safe and reliable heating systems using the waste heat of the engine for heating the car interior. However, during engine shut-down periods in cold weather, the interior of the car may become extremely cold and the outside surface of the windshield of the car may become so "cold layered" (i.e. coated with a layer of condensation, frost, snow or ice) as to make it difficult or impossible to see through the windshield. Thus, in cold weather, it is not uncommon for early morning operators to drive more or less blind because the front windshield and/or other glassed areas of the car are cold layered. While driving under such conditions is hazardous, it is often done.

In the prior art, an auxiliary booster heater is used to heat the engine-cooling liquid during engine warm-up periods to reduce the time required to obtain high operating efficiencies and to supply heat for car heating purposes (Mizer U.S. Pat. No. 3,133,527); while waste heat from the exhaust system is used in one case and booster heat in another case to increase the supply of heat for car heating purposes (Gospodar U.S. Pat. No. 3,168,244; Raymond U.S. Pat. No. 3,236,453). The Oaks U.S. Pat. No. 2,507,463 uses a chemical during non-operating periods to supply heat to prevent freeze-ups under arctic weather conditions.

So far as I know, no one has heretofore proposed to reduce or eliminate blind driving in cold weather except through the use of long car warm-up periods or of devices for mechanically scrapping cold layers from the windshield of the car.

SUMMARY OF THE INVENTION

Objects of the Invention

The principal object of the present invention is to provide a simple and reliable system for reducing, eliminating or avoiding the formation of the cold layers, which are responsible for blind driving and the hazards it creates.

Another object is to provide a simple and inexpensive system, which during engine shut-down periods in cold weather, operates to insure a high degree of visibility through the glassed areas of the car.

Another important object is to insure, at the end of the shut-down period, that the interior of the car will be at least half-way comfortable under any of the colder weather conditions.

Statement Of The Invention

All of the important objects of my invention are achieved by providing the automobile with an auxiliary heating system (comprising an auxiliary heater and automatic controls) which is operatively mounted in an automobile and arranged to heat the interior of the car to a predetermined above-freezing but subnormal temperature during engine shut-off periods in cold weather when the weather temperature is at or below said predetermined temperature. The operation of my auxiliary system preferably is instituted automatically when the engine is shut off if the weather is cold enough. If desired, it may be delayed by a manually settable timer, particularly when the operator of the car knows that he will be absent from the car for a long period of time. In any case, my system should be arranged automatically to start sufficiently in advance of the absent operator's return time, to insure clear visibility through all glassed areas of the car by the time he returns. Preferably, it should also insure that the interior of the car will reach a temperature, which is at least half-way comfortable at the end of the shut-down period.

BRIEF DESCRIPTION OF THE DRAWINGS

The presently preferred embodiment of the invention is illustrated in the accompanying drawings wherein.

DESCRIPTION OF THE PREFERRED EMBODIMENT

Conventional Structure

Figure 1:
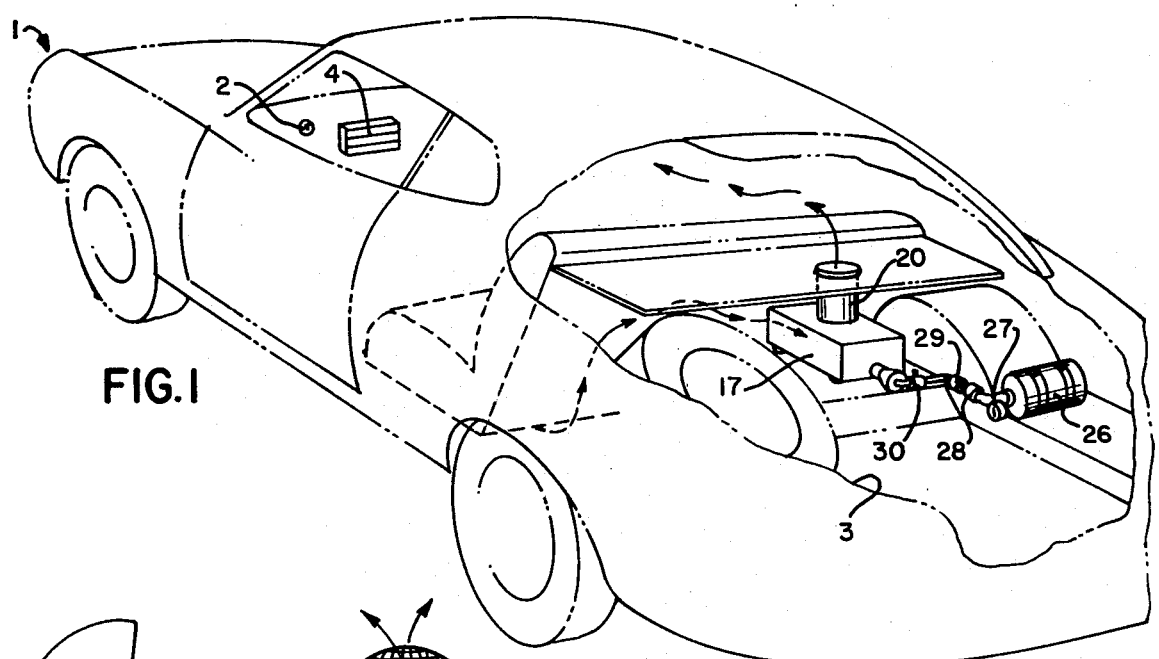
FIG. 1 is a perspective view of an automobile equipped with the preferred embodiment of my auxiliary gas heating system for heating the interior of the vehicle during engine shut-down periods.
Figure 2:
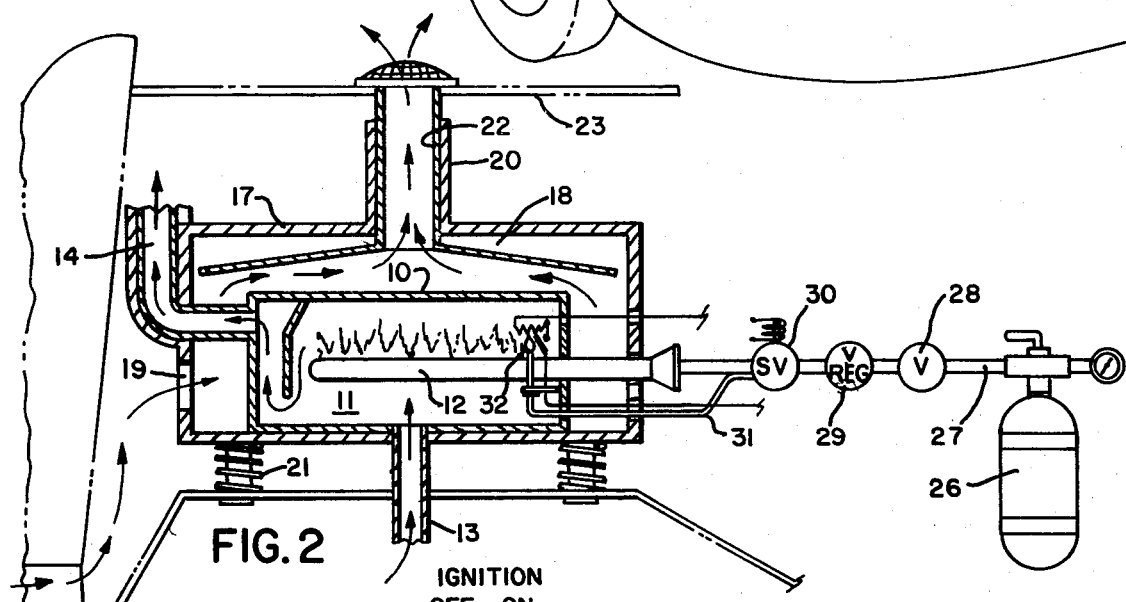
FIG. 2 is a somewhat schematic view of the gas heating system shown in FIG. 1, this view showing the auxiliary heater in longitudinal vertical section and including a side elevational view of the gas supply line.

The drawing conventionally illustrates an automobile 1 having an ignition key receptacle 2 on its dashboard, a rear trunk compartment 3, and a heater utilizing the waste heat of the car engine for heating the car interior by discharging heated air through a main heater outlet 4 on or associated with its dashboard. In conventional operation, the operator inserts an ignition key into the ignition key receptacle 2 and turns it on to start the car. During cold weather, he also operates some conventional form of heater control (not shown) to place the main car heating system in operation. This system is always inoperative when the engine is shut down. With the engine running and the main heating system placed in operation, a stream of air is forced to flow through outlet 4 into the car. Usually the waste heat of the engine is used to heat this air while manual or automatic controls may be employed to regulate the quantity of air and the interior temperature of the car.

Inventive Structure

In accordance with the present invention, an auxiliary heating system, comprising an auxiliary heating apparatus (including gas supply means) and controls for that heating apparatus, is operatively mounted in the car and arranged to operate only during engine shut-off periods in cold weather and only when the ambient room temperature in the car is at or below a predetermined value. In operation, it functions to maintain the interior or room temperature of the car at a predetermined subnormal value, which is very substantially below the room temperature range of 65° to 70° F. and appreciably above freezing.

It will be understood that the magnitude of the temperature, which the auxiliary system maintains when that system is placed in operation, is a matter of the designer's choice. For the purposes of this invention, it should be very substantially below the conventional range of normal room temperatures, which range is assumed to extend from about 65° F. to about 75° F. On the other hand, it is essential that said predetermined temperature should be high enough to insure visibility through the glassed areas of the car under most weather conditions where such areas may otherwise be covered with condensation, frost, snow or ice. Accordingly, I recommend temperatures not appreciably above 45° F. and not appreciably below 40° F. As a matter of fact, I prefer a temperature of about 40° F. because I have found that, in the State of Kentucky, it will normally insure visibility.

Auxiliary Heating Apparatus

The heater and the associated gas supply means, which constitutes the heating apparatus of the auxiliary system, is preferably located within the trunk compartment although it may be located elsewhere as, for example, under one seat of the car. The heater comprises: an inner shell 10 containing a combustion chamber 11, a gas burner 12, a bottom air inlet 13 and an upper side gas outlet or flue 14 for venting the products of combustion in some suitable way to the outside atmosphere; an outer shell 17, enclosing the inner shell 10 and cooperating with it to provide an air heating space or chamber 18 extending around and over the inner shell 10, the outer shell 17 having a lower side air inlet 19 and a top hot air outlet 20 projecting upwardly through the trunk compartment and arranged to discharge the heated air into the interior of the car. The outer shell 17 is resiliently mounted on the floor of the trunk compartment through springs 21 while its hot outlet 20 is connected to the interior of the car through a sleeve 22, which is fixed to a wall 23 of the car and which is slidably fitted to the bore of the outlet pipe 20 for vertical movement relative thereto.

The gas supply means comprises: a reservoir 26 for storing fuel gas under pressure; a main conduit 27 for directing gas from reservoir 26 into the burner 12 successively through a shut-off valve 28, a pressure regulating valve 29 and a supply valve 30 of the solenoid-opened spring-closed type; and an auxiliary conduit 31 for directing pilot gas from the upstream side of supply valve 30 into the combustion chamber 11 to provide a pilot light 32 adjacent burner 12.

Controls

The controls for the auxiliary heating apparatus comprises: an igniter circuit for the pilot light; and a gas supply circuit controlling the flow of gas to the burner.

Figure 3:
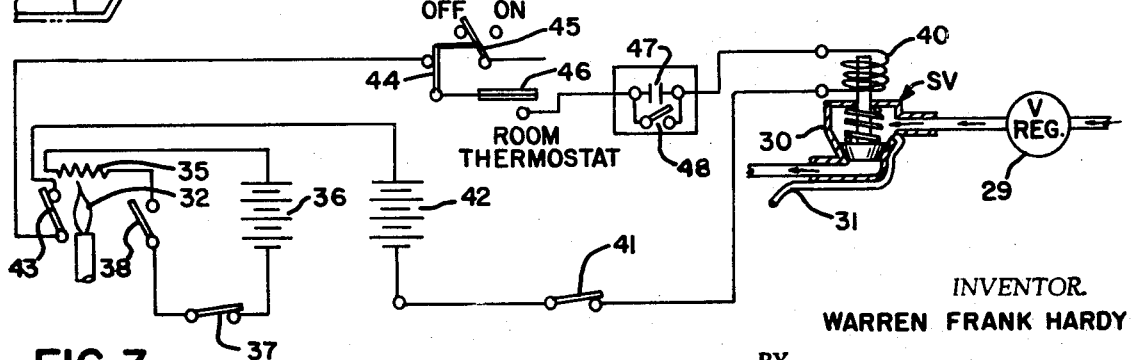
FIG. 3 is a schematic diagram of an igniter circuit for igniting the gaseous fuel of the heater and of the electrical gas supply circuit and related apparatus for effecting the automatic opening and closing of the valve which controls the supply of gas to the auxiliary heater.

The igniter circuit, which, as shown in FIG. 3, is normally open, comprises: an igniting element 35 in the form of an electrical resistor; a battery 36 for supplying the resistor 35 with the current required to render it incandescent; a N/C (i.e. normally closed) manually operated line switch 37; and a N/O (i.e. normally open) thermostatically operated or "thermo" line switch 38 located adjacent the pilot light 32 and arranged to close when that light goes out. Since the pilot light is normally lit, this thermo line switch 38 will normally be open.

The gas supply circuit functions, when closed, to supply current to the solenoid coil 40 of the supply valve 30 for valve opening purposes. Besides coil 40, this circuit serially includes a N/C manually operated main line switch 41, a battery 42, a N/O thermo line switch 43 adjacent the pilot light 32, an ignition controlled line switch 44, which is N/O when the ignition switch 45 is closed (i.e. "on") and N/C when it is off, a thermo line switch 46 controlled by the room temperature of the car to be N/O when the room temperature of the car is above said predetermined 40° F. temperature and N/C at and below that value, and a N/O clock controlled line switch 47 which, when time-control is not in use, may be shunted out by closing a shunt switch 48. When the engine is operating, the auxiliary system is inoperative.

Operation

For a specific explanation of operation, we assume the following conditions, viz: first, that the room thermostat 46 of the auxiliary heating system is set to be open at room temperatures above and to be closed at or below room temperatures of 40° F. more or less, hence, the auxiliary heating system can operate only when the room temperature of the interior of the car is at or below 40° F.; second, that the prevailing weather is cold, say about 25° F.; and third, that an operator drives his car home with the main heater operating to heat the car interior to and maintain it at a room temperature of about 72° F. Under these conditions, the auxiliary heater will be inoperative not only because the room temperature of the car is above 40° F. but also because the car ignition switch 45 is on or closed.

We also assume: that, when the operator arrives at his home, he enters an outside parking area for overnight parking, turns the ignition switch 45 off, thereby closing the interlocked line switch 44 in the auxiliary system, and then readies the auxiliary system for automatic operation, beginning at 6:00 AM the next morning. This involves: closing its manually operated line switch 41, if it is not already closed as it should be, and setting its clock control to close the time-controlled line switch 47 at 6:00 AM the next morning. In accordance with the preferred practice, the pilot light 32 is lit at all times; hence, the pilot-light-controlled line switch 43 in the gas supply circuit, controlling the flow of gas, is closed while the corresponding line switch 38 in the gas igniter circuit is open.

We now assume that, during the night, the outside temperature drops to 20° F. before (and remains at 20° F. through) 6:00 AM the following morning. Prior to 6:00 AM, nothing happens to the auxiliary system even though the interior temperature of the car falls to about 20°, which it should do under the assumed conditions. When the room temperature of the car drops to 40°, the thermo line switch 46 will close but the clock controlled line switch 47 and its shunt 48 remain open. At 6:00 AM, the clock control will close its line switch and this will close the gas supply circuit because, in that circuit, all other switches are closed.

With current flowing through the gas supply circuit, the solenoid coil 40 in that circuit opens the supply valve 30 and holds it open permitting gas to flow from the supply tank 26 through the conduit 27, the open shut-off valve 28, the pressure regulating valve 29 and the supply valve 30 into the combustion chamber 11 of the heater where the flow of gas is ignited by the pilot light 32. With the auxiliary heater thus placed in heating operation, the low (20° F.) room temperature of the car will rise to the 40° value and then be automatically held there through the opening-closing action of thermo line switch 46.

We assume that the auxiliary heater will heat the car interior from 20° to a 40° F. temperature within say 1 hour under the coldest of weather conditions; hence, the operator of the car may expect the interior temperature of the car to be at the 40° level no later than 7:00 AM and to remain at that level from that time on, so long as the ignition remains off and the outside temperature remains below 40° F. If the continuously burning pilot light 32 goes out after 6:00 AM, the open igniter circuit will close promptly thereafter by the self-closing action of the thermo line switch 38, which is in the form of a bi-metal thermostatic switch. This thermo line switch 38 is normally held open by the action of the pilot light heat on its thermostat. The loss of that heat automatically causes it to close the igniter circuit, which then re-ignites the pilot light 32.

It will be appreciated that, if a cold layer (frost, ice or snow) covered the windshield during the night, then, under the foregoing conditions of operation, that cold layer would be reduced or eliminated between 6:00 and 7:00 AM by the operation of the auxiliary heating system. It will also be appreciated that, where a time delay is not employed, the car interior temperature will drop from 70° to 40° F. before the auxiliary system starts to operate. Thereafter it should normally prevent any cold layer from forming.

My invention may be viewed as an improvement in an automotive vehicle of the type having a heat-generating vehicle-propelling engine, a main heating system using waste heat of the engine to heat the interior of the car only when the engine is operating, and a glassed area which, from time to time during cold weather, is subject to visibility-reducing formations of cold layers. My improvement comprises: an auxiliary heating system for heating the car interior during engine shut-down periods when the ambient atmospheric temperature is at or below a predetermined subnormal value, which is substantially below the normal room temperature range and which is appreciably above freezing temperature conditions. This system is composed of an auxiliary heating apparatus, which comprises the heater and gas supply means, and controls. The apparatus is operative, when energized, to heat the interior of the car. The controls are provided by the electrical gas supply circuit, which operates, in response to the shut-down of the engine, to ready the auxiliary heating apparatus for energization. It also operates, in response to car room temperatures at and below said predetermined subnormal value, to energize said heating apparatus.

Modification

In place of battery 42 and thermo line switch 43 in the gas supply circuit, other suitable means for energizing that circuit to open gas supply valve 30 may be employed. For use as one of such means, I recommend a flame powered system such as the "Basotron" flame powered gas appliance control system which is presently made and sold by the Baso Division of Penn Controls, Inc., Milwaukee, Wis. 53215. This arrangement, which is well known and in wide use, uses a Type B30D power thermocouple in place of battery 42 and thermo line switch 43. The power thermocouple, when heated by the pilot light 32, supplies the electrical energy required to operate the valve 30 and thus makes the electrical gas supply circuit independent of any other source of power.

Having described my invention, I claim:

1. In an automotive vehicle of the type having a heat-generating vehicle-propelling engine, a main heating system using waste heat of the engine to heat the interior of the car only when the engine is operating, and a glassed area which, from time to time during cold weather, is subject to visibility-reducing formations of cold layers, an improvement comprising:
   A. an auxiliary heating system for heating the car interior during engine shut-down periods when the ambient atmospheric temperature is at or below a predetermined subnormal value, which is substantially below the normal room temperature range, said system including
      1. auxiliary heating apparatus operative, when energized, to heat the interior of the car,
      2. readying means operating, in response to the shut-down of said engine, to ready said auxiliary heating apparatus for energization, and
      3. thermal response means operating, in response to car room temperatures at and below said predetermined value, for energizing said heating apparatus.

2. The improvement of claim 1 wherein:
   A. the readying means includes a switch which is normally open when the engine is operating and closed when it is shut down.

3. The improvement of claim 1 wherein:
   A. the thermal response means includes a switch which is normally open when the car room temperatures are above said predetermined value and closed when the car room temperatures are at or below said predetermined value.

4. The improvement of claim 1 wherein:
   A. said thermal response means includes time controlled means for delaying the energizing of said heating apparatus to a set time.

5. The improvement of claim 1 wherein:
   A. said auxiliary heating apparatus includes
      1. an endless gravity-flow air-circulating system having a hot air chamber with an upper outlet for discharging warm air openly into a car interior and with a lower inlet for receiving relatively cold air openly from said car interior,
      2. a heater chamber to heat said hot air chamber,
      3. a heater associated with said heater chamber,
      4. a source of fluid fuel for said heater,
      5. normally closed fluid flow means operative, when open, to supply fuel from said source to said heater, and
      6. a pilot for igniting the heater fuel when supplied; and
   B. said thermal response means operates, in response to said car temperature by opening said fluid flow means to supply fuel to said heater.

6. The improvement of claim 5 wherein:

A. said pilot burns fluid fuel continuously during the operation of both of said main and auxiliary heating systems.

* * * * *